(12) United States Patent
Cariccia et al.

(10) Patent No.: US 10,718,410 B2
(45) Date of Patent: Jul. 21, 2020

(54) BELT TENSIONER FOR A BELT DRIVE

(71) Applicant: DAYCO EUROPE S.R.L., Chieti (IT)

(72) Inventors: Gianluca Cariccia, Oristano (IT); Antonino Cimino, Reggio Calabria (IT)

(73) Assignee: Dayco Europe S.R.L., Chieti (IT)

( * ) Notice: Subject to any disclaimer, the term of this patent is extended or adjusted under 35 U.S.C. 154(b) by 166 days.

(21) Appl. No.: 15/104,646

(22) PCT Filed: Dec. 17, 2014

(86) PCT No.: PCT/IB2014/067040
§ 371 (c)(1),
(2) Date: Jun. 15, 2016

(87) PCT Pub. No.: WO2015/092718
PCT Pub. Date: Jun. 25, 2015

(65) Prior Publication Data
US 2017/0002902 A1  Jan. 5, 2017

(30) Foreign Application Priority Data

Dec. 17, 2013  (IT) .............................. TO2013A1032

(51) Int. Cl.
*F16H 7/12* (2006.01)
*F16H 7/08* (2006.01)

(52) U.S. Cl.
CPC ......... *F16H 7/1209* (2013.01); *F16H 7/0829* (2013.01); *F16H 7/1218* (2013.01);
(Continued)

(58) Field of Classification Search
CPC ............. F16H 2007/081; F16H 7/1218; F16H 2007/084; F16H 7/1281; F16H 2007/0893
(Continued)

(56) References Cited

U.S. PATENT DOCUMENTS 4,725,260 A * 2/1988 Komorowski ........ F16H 7/1218
474/135
5,083,983 A * 1/1992 Hirai .................... F16H 7/1218
474/135
(Continued)

FOREIGN PATENT DOCUMENTS

CN 1809703 A 7/2006
CN 102741588 A 10/2012
(Continued)

OTHER PUBLICATIONS

PCT, International Search Report and Written Opinion, International Application No. PCT/IB2014/067040, dated Mar. 27, 2015.
(Continued)

*Primary Examiner* — Henry Y Liu
(74) *Attorney, Agent, or Firm* — FisherBroyles, LLP; Susan M. Oiler (57) ABSTRACT

A belt tensioner for a belt drive of a motor vehicle engine, comprising: a fixed part configured to be fixed with respect to the engine and provided with a pivot defining a rotation axis; an arm having a connection portion hinged to the pivot and rotatable about the rotation axis and an opposite portion rotatably supporting a pulley configured to cooperate with a belt of the drive; a main spring interposed between the fixed part and the arm to exert thrust on the arm such as to rotate said arm towards the belt; and at least one rolling bearing interposed between the arm and the pivot to support the arm and ensure the alignment thereof.

17 Claims, 6 Drawing Sheets

(52) U.S. Cl.
CPC .. *F16H 2007/081* (2013.01); *F16H 2007/084* (2013.01); *F16H 2007/0865* (2013.01); *F16H 2007/0893* (2013.01)

(58) Field of Classification Search
USPC .......................................................... 474/135
See application file for complete search history.

(56) References Cited

U.S. PATENT DOCUMENTS

| | | | | | |
|---|---|---|---|---|---|
| 5,803,849 | A | * | 9/1998 | Ayukawa | F16H 7/1218 474/135 |
| 6,497,632 | B2 | * | 12/2002 | Ayukawa | F16H 7/1218 474/135 |
| 6,609,988 | B1 | * | 8/2003 | Liu | F16H 7/1218 474/133 |
| 7,004,863 | B2 | * | 2/2006 | Serkh | F16H 7/1218 474/109 |
| 7,819,765 | B2 | * | 10/2010 | Kawahara | F16H 7/1218 474/135 |
| 8,075,433 | B2 | * | 12/2011 | Quintus | F16H 7/1218 474/135 |
| 8,118,698 | B2 | * | 2/2012 | Guhr | F16H 7/1218 474/135 |
| 8,142,314 | B2 | * | 3/2012 | Antchak | F16H 7/1218 474/135 |
| 8,439,781 | B2 | * | 5/2013 | Lannutti | F16H 7/1218 474/135 |
| 8,517,873 | B2 | * | 8/2013 | Liebel | F16H 7/1218 474/133 |
| 8,613,680 | B2 | * | 12/2013 | Frankowski | F16H 7/1218 474/133 |
| 8,651,988 | B2 | * | 2/2014 | Kapfer | F16C 13/006 474/101 |
| 8,678,965 | B2 | * | 3/2014 | Ishida | F16H 7/1218 474/113 |
| 8,690,718 | B2 | * | 4/2014 | Cantatore | F16H 7/1281 474/101 |
| 9,212,731 | B2 | * | 12/2015 | Lindstrom | F16H 7/1218 |
| 9,377,090 | B2 | * | 6/2016 | Ma | F16H 7/1218 |
| 9,777,807 | B2 | * | 10/2017 | Barillet | F16H 7/1281 |
| 2002/0010044 | A1 | * | 1/2002 | Ayukawa | F16H 7/1218 474/135 |
| 2002/0177499 | A1 | * | 11/2002 | Ayukawa | F16H 7/1218 474/135 |
| 2006/0079360 | A1 | * | 4/2006 | Jung | F16H 7/1218 474/135 |
| 2007/0281521 | A1 | * | 12/2007 | Kawahara | F16H 7/1218 439/134 |
| 2010/0234155 | A1 | * | 9/2010 | Antchak | F16H 7/1218 474/135 |
| 2011/0177897 | A1 | | 7/2011 | Ward et al. | |

FOREIGN PATENT DOCUMENTS

| | | |
|---|---|---|
| DE | 102007039133 | 2/2009 |
| EP | 0425246 | 5/1991 |
| JP | H05-30595 U | 4/1993 |
| WO | 2004008304 A2 | 1/2004 |
| WO | 2008/027369 | 3/2008 |

OTHER PUBLICATIONS

Chinese Office Action dated Jan. 31, 2018 in CN201480069040.X (6 pages).

CN. Non-Final Office Action with English Translation; Chinese Application No. 2016-540654 (dated Oct. 23, 3018).

* cited by examiner

BELT TENSIONER FOR A BELT DRIVE

TECHNICAL FIELD

The present invention relates to a belt tensioner for a belt drive, and particularly, but not exclusively, for an accessory drive of an industrial vehicle.

BACKGROUND ART

As is known, tensioners for accessory drives comprise a fixed part configured to be fastened to the engine and defining a rotational pivot, an arm rotatably supported on the rotational pivot and carrying, at one end, a pulley suitable for cooperating with a drive belt and a spring acting on the arm to tension the belt.

Known tensioners of the above-stated type must meet certain functional requirements aimed at optimizing the life of the tensioner and of the belt. In particular, it is necessary that the arm is kept in perfect alignment, i.e. it rotates on a plane orthogonal to the axis of the pivot and is not subjected to oscillations outside the plane that might result in noise, premature wear and, eventually, belt slippage.

The alignment function is normally delegated to one or more bushings, made of a plastic or composite material, having the function of a sliding bearing for the radial and axial support of the arm on the pivot.

These bushings are subject to wear; in consequence, the tensioner has a limited life, in any case shorter than that of the vehicle.

Hydraulic tensioners have been developed to solve this problem, wherein the force acting on the arm is generated by a hydraulic piston. Since the piston can be oriented to minimize the resultant of the forces acting on the pivot, hydraulic tensioners are normally components not subject to replacement during the life of the vehicle. However, hydraulic tensioners are more complex and expensive than conventional mechanical tensioners.

DISCLOSURE OF INVENTION

The object of the present invention is to provide a mechanical tensioner that overcomes the above-described problems of the known art.

The above-stated object is achieved by the tensioners disclosed herein.

BRIEF DESCRIPTION OF THE DRAWINGS

For a better understanding of the present invention, a preferred embodiment is described below by way of non-limitative example and with reference to the accompanying drawings, where.

BEST MODE FOR CARRYING OUT THE INVENTION

With reference to the FIGS. 1-4, a tensioner for an accessory drive of an industrial vehicle in indicated, as a whole, by reference numeral 1.

The tensioner basically comprises a fixed part 2 suitable for being fastened to the engine, an arm 3 that is rotatable with respect to the fixed part 2 about an axis A, a pulley 4 rotatably carried by the arm 3 and suitable for cooperating with a belt (not shown) and a spring 5 constrained to the fixed part 2 and to the arm 3 to exert an elastic load on the latter such as to push the pulley 4 into contact with the belt.

More specifically, the fixed part 2 comprises a base plate 6 suitable for resting on a surface of the engine and a hollow, substantially cylindrical pivot 7, aligned along axis A, embedded in a central hole 8 of the base plate 6 and projecting from the latter.

The fixed part 2 can be fastened to the engine by a screw 9 that passes through the pivot 7.

The arm 3 includes a hollow, substantially cylindrical connection portion 10, comprising an outer wall 11 and an inner wall 12, forming between them a cavity 13 open towards the base plate 6, which is at least partially housed inside a front edge of the outer wall 11.

The arm 3 is supported on the fixed part 2 by a pair of rolling bearings 14 and 15, preferably ball bearings, radially interposed between the inner wall 12 of the connection portion 10 of the arm 3 and the pivot 7. As labelled in FIG. 2, each one of the bearings 14 and 15 conveniently has an inner race 16 embedded on the pivot 7 and an outer race 17 embedded on the inner wall 12.

Figure 2:
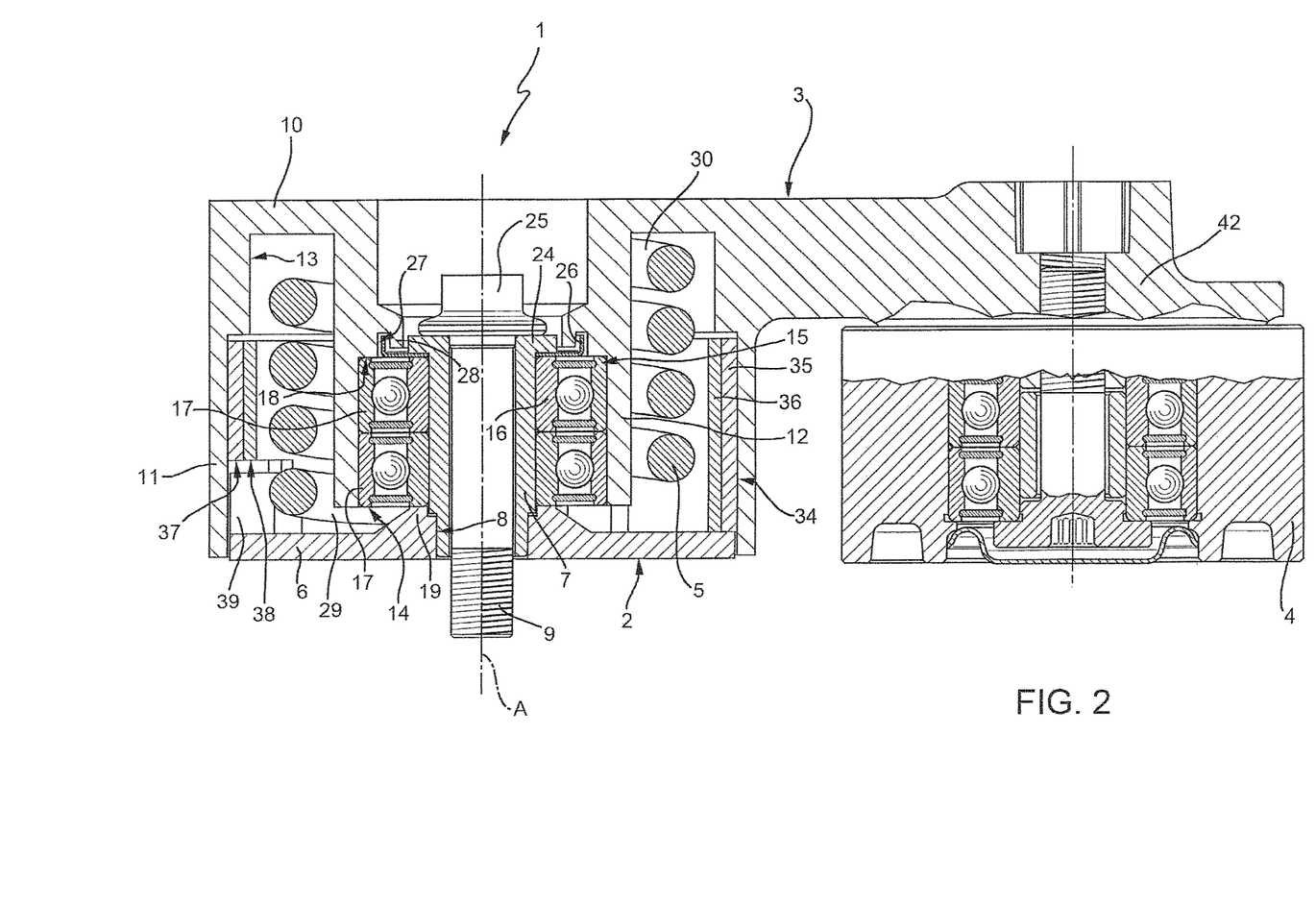
FIG. 2 is a cross-section of the tensioner along a median plane of the arm.

The bearings 14 and 15 axially abut against each other; the outer race 17 of bearing 15 axially abuts against the inner shoulder 18 of the inner wall 12. The inner race 16 of bearing 14 axially abuts against an annular shoulder 19 of the base plate 6 surrounding the pivot 7.

The bearings 14 and 15 balance the tilting torques acting on the arm 3 due to the contact between the pulley 4 and the belt, ensuring perfect alignment of the arm throughout the life of the tensioner 1.

Conveniently, a dust-protection ring 20 is mounted between the inner race 16 of the bearing 15 and an end shoulder 24 of the pivot 7, upon which the head 25 of the screw 9 acts. The ring 20 conveniently comprises an outer rim 26 axially folded in the direction opposite to the bearing 15, which engages, with play, an annular cavity 27 formed between the inner wall 12 and an inner projection 28 of the 12, so as to form a labyrinth seal.

The spring 5 is housed inside cavity 13 and has a first end coil 29 constrained to the fixed part 2 as described hereinafter, and a second end coil 30 constrained to arm 3 in a conventional manner.

Figure 1:
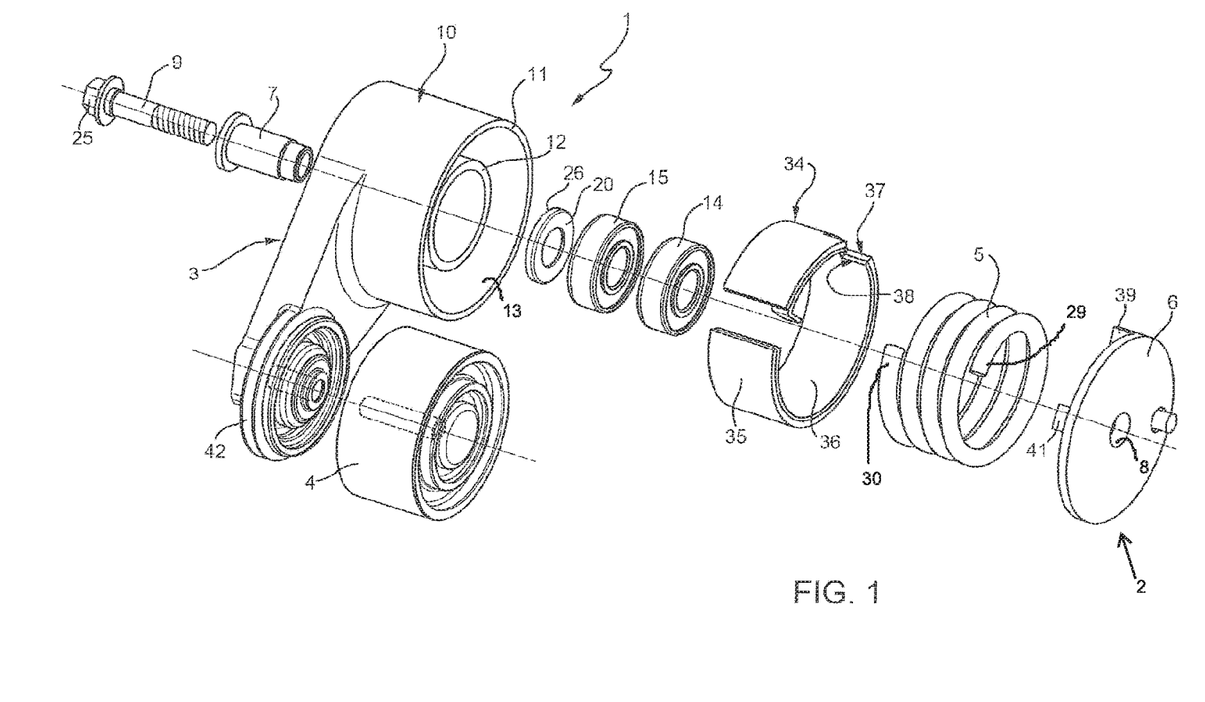
FIG. 1 is an exploded perspective view of a tensioner according to the present invention.

The tensioner 1 also comprises a damping device 34 suitable for damping the relative oscillations between the arm 3 and the fixed part 2. The damping device 34 is arranged overlapping the bearings 14 and 15 in a radial direction. In particular, the damping device 34 comprises an open C-shaped cylindrical bushing 35, made of a plastic material, housed in cavity 13 in contact with the outer wall 11, and a blade spring 36, of similar shape, housed inside the bushing 35 in a forced manner, so as to exert an elastic load on the bushing and keep it in contact with the outer wall 11 in a forced manner.

Figure 3:
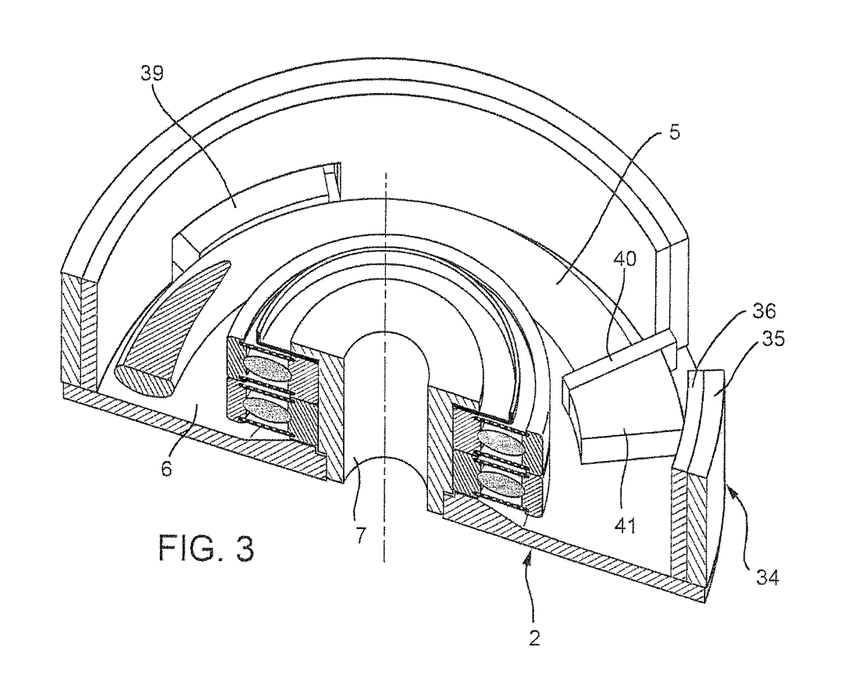
FIG. 3 is a partial perspective view of a fixed part of the tensioner in FIGS. 1 and 2.
Figure 4:
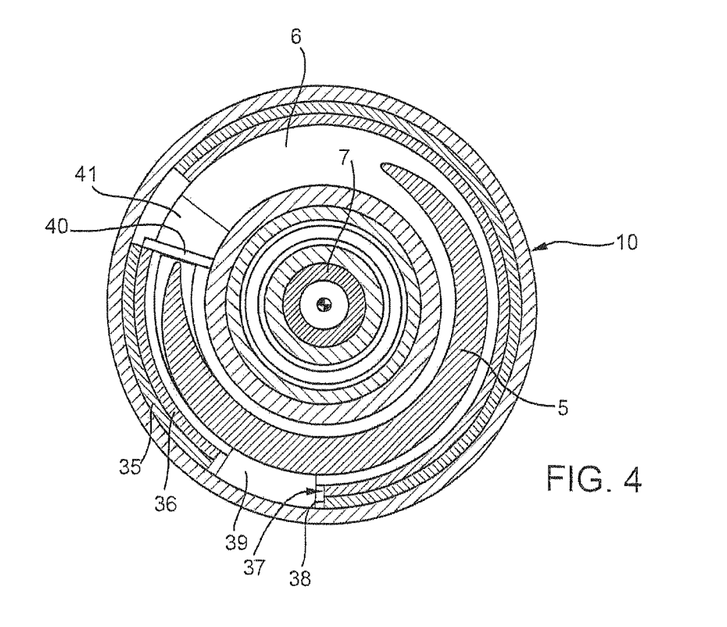
FIG. 4 is a cross-section along line IV-IV in FIG. 1.

With reference to FIGS. 3 and 4, the bushing 35 and the blade spring 36 have respective notches 37 and 38, which are engaged by a projection 39 extending from the base plate 6 and are therefore rotationally locked. Projection 39 also functions as a rest for the spring 5.

At one end, the blade spring 36 has a portion 40 folded radially inwards, which rests against a further projection 41 of the base plate 6 and acts as a stop for the end of the first coil 29 of the spring 5.

The pulley 4 is rotatably mounted on an end 42 of the arm 3 opposite to the connection portion 10 in a conventional manner that is not shown.

The operation of the tensioner 1 is as follows.

The arm 3 is supported on the pivot 7 by the bearings 14 and 15, which provide the alignment function, i.e. they ensure that the rotation of the arm 3 takes place parallel to a plane perpendicular to axis A. As rolling bearings are used, their wear is negligible and the alignment of the arm is therefore assured for the entire life of the vehicle. The damping function is provided by device 34, which behaves asymmetrically: when the arm 3 turns in a first direction towards the belt, the friction contact between the outer wall and the bushing 35 tends to radially contract the spring 36, reducing the contact pressure and consequently the damping. Vice versa, when the arm 3 turns in the opposite direction, the blade spring 36 tends to expand, increasing the contact pressure between the outer wall 11 and the bushing 35.

Figure 5:
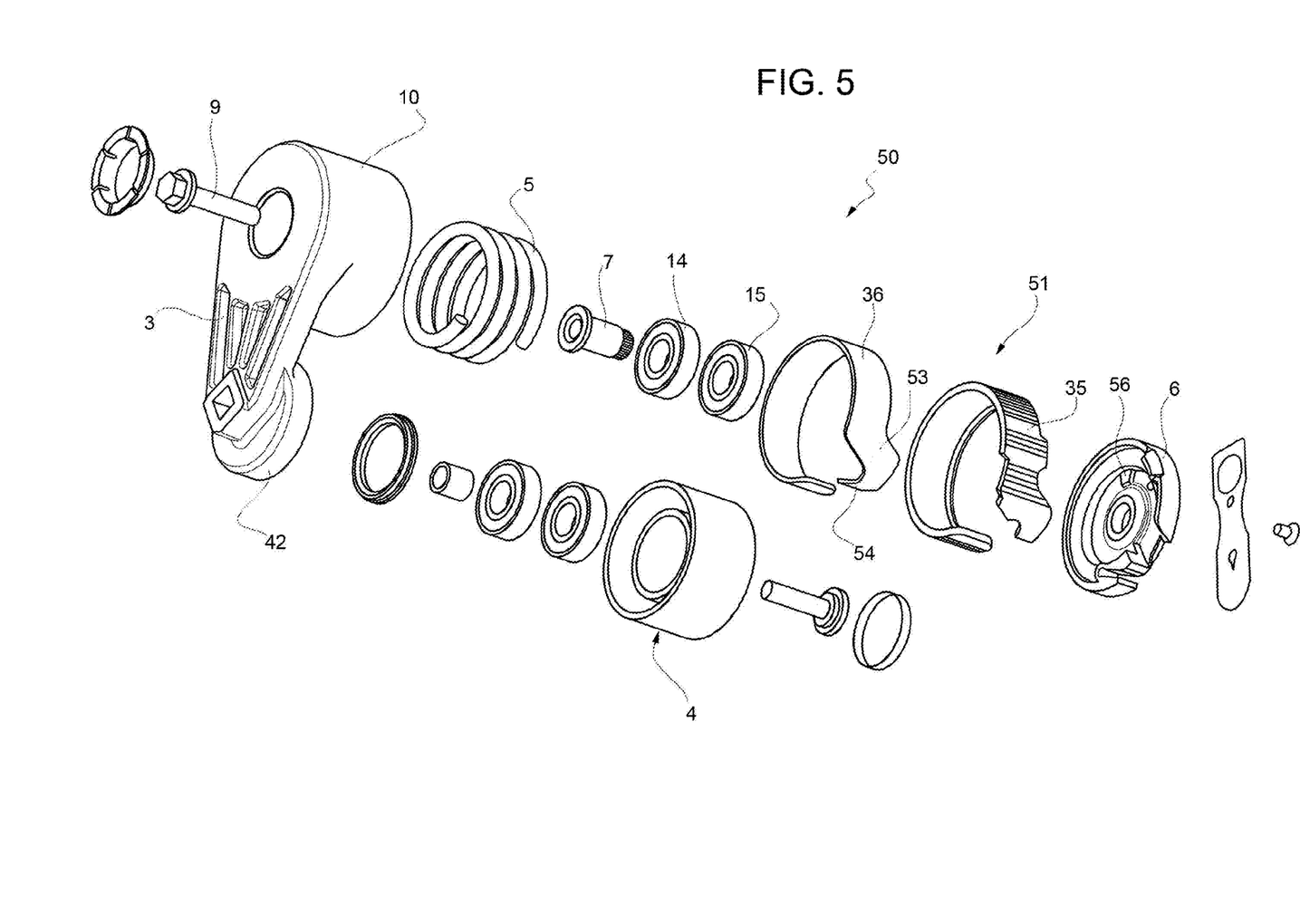
FIG. 5 is an exploded perspective view of a second embodiment of a tensioner according to the present invention.
Figure 6:
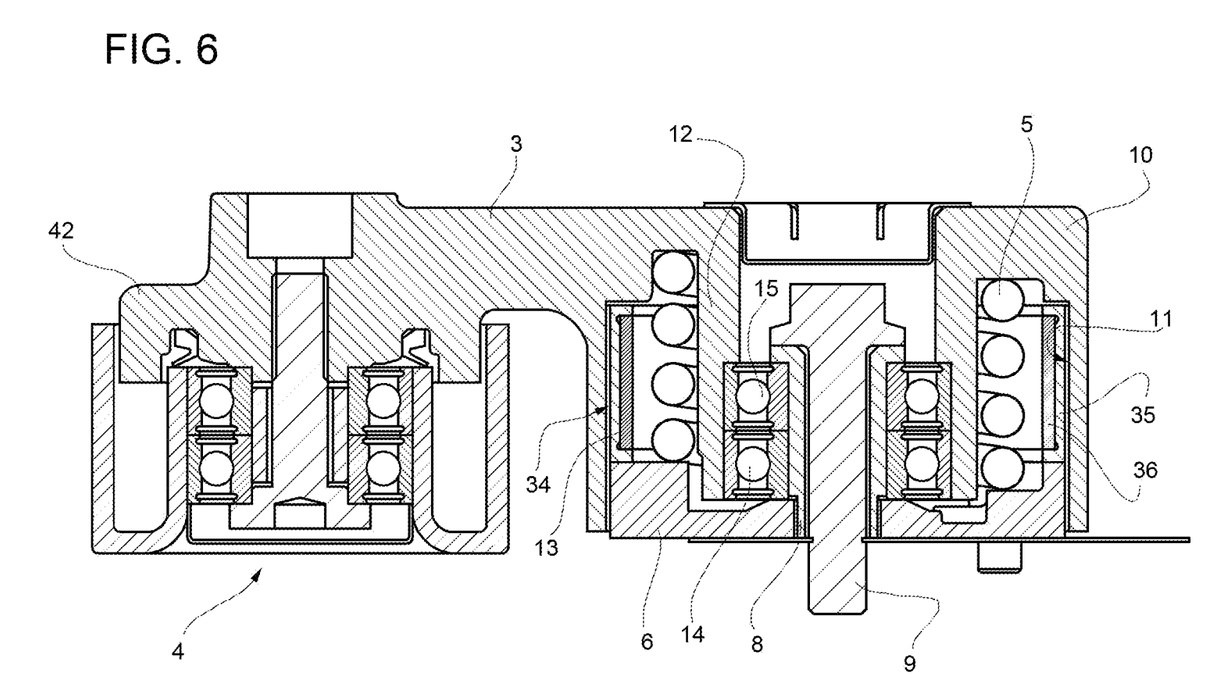
FIG. 6 is a cross-section of the tensioner along a median plane of the arm.
Figure 7:
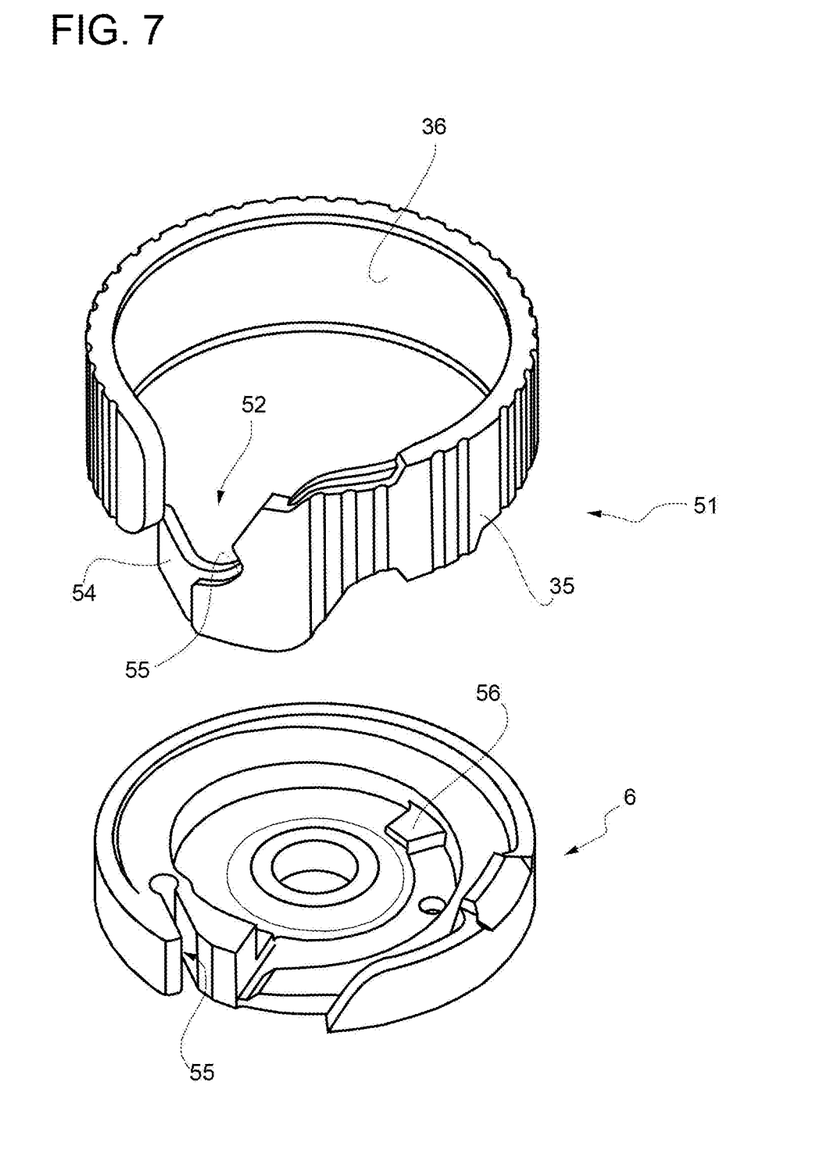
FIG. 7 is an exploded perspective view, on an enlarged scale, of a damping device of the tensioner in FIG. 5.

FIGS. 5 to 7 illustrate a tensioner 50 that differs from the described tensioner 1 mainly in a different embodiment of the damping device, in this case indicated by reference numeral 51.

The damping device 51 still comprises a bushing 35 made of a plastic material and a blade spring 36; the latter comprises a shaped end 52 formed by a portion 53 inclined in the axial direction and by an end portion 54 prismatically engaging a slot 55 made in the base plate 6. Portion 53 is inclined towards the base plate 6 and has the purpose of connecting end portion 54, arranged at the level of the base plate 6, with the main annular portion of the blade spring 36, placed around spring 5, avoiding interference with the first coil of this spring, which in this case rests directly against a projection 56 of the base plate 6.

The bushing 35 externally surrounds the blade spring 36, up to and including the opposite axial ends, and is preferably over-pressed on spring 36.

The damping device 54 is mounted with radial interference inside the outer wall 11 of the connection portion 10 of the arm 3.

From examination of the characteristics of the tensioner 1 provided according to the present invention, the advantages that may be achieved therewith are evident.

The use of rolling bearings 14 and 15 for the support and alignment of the arm 3 enable achieving a substantially wear-free product, and therefore not subject to replacement for the entire life of the vehicle, and with much lower costs with respect to hydraulic tensioners of the known art.

The bearings 14 and 15 balance the tilting torques acting on the arm 3 due to the contact between the pulley 4 and the belt, ensuring perfect alignment of the arm throughout the life of the tensioner 1 and preventing the tilting torques from interacting with the damping device and causing a progressive change in the damping provided over time.

The various functions of the tensioner (tensioning of the belt via the spring 5, support of the arm via the bearings 14 and and damping via the damping device 34) are performed independently of each other by dedicated members or devices that do not functionally interact with one another. In the examples shown, the damping device 34 is placed in contact with the outer wall 11. Although this arrangement is advantageous from the heat dissipation viewpoint, it would be possible to place the damping device 34 inside spring 5, in contact with the inner wall 12. Obviously, in this case spring 36 should enclose the bushing 35 from the outside.

Furthermore, it is possible to use a radial or axial action symmetric damping device in addition to or as a replacement for the described asymmetric damping device 34.

The invention claimed is:

1. A belt tensioner for a belt drive of a motor vehicle engine, comprising:
   a fixed part (2) configured to be fixed with respect to the engine and provided with a pivot (7) defining a rotation axis (A);
   an arm (3) having a connection portion (10) hinged to the pivot (7) and rotatable about the rotation axis (A) and an opposite portion (42) rotatably supporting a pulley (4) configured to cooperate with a belt of the drive;
   a main spring (5) interposed between the fixed part (2) and the arm (3) to exert thrust on said arm (3) such as to rotate said arm towards the belt; and
   at least one rolling bearing (14, 15) interposed between the arm (3) and the pivot (7), wherein said rolling bearing (14, 15) supports tilting loads on the arm (3); and
   a damping device (34) for damping oscillations of the arm (3) with respect to the fixed part (2) arranged at least partially overlapping said rolling bearing (14, 15) in a radial direction, the damping device comprises a second spring (36) exerting an elastic load biasing a damping member (35) into contact with a wall of the arm (3) and being rotationally locked to the fixed part (2);
   wherein said rolling bearing prevents tilting loads from interfering with said damping device (34);
   wherein a plane perpendicular to the rotation axis (A) positioned through the at least one roller bearing passes through the pulley.

2. A tensioner according to claim 1, further comprising two rolling bearings (14, 15) constituted by respective ball bearings interposed between the connection portion (10) and said pivot (7).

3. A tensioner according to claim 2, wherein the connection portion (10) comprises an outer cylindrical wall (11) and an inner cylindrical wall (12) delimiting between them an annular cavity (13) housing said main spring (5), said rolling bearings constituted by respective ball bearings (14, 15) being radially set between said pivot (7) and said inner cylindrical wall (12).

4. A tensioner according to claim 1, wherein said damping device (34) acts radially.

5. A tensioner according to claim 1, wherein said damping device (34) has a damping intensity dependent on the direction of rotation of the arm (3).

6. A tensioner according to claim 1, wherein the damping device (34) comprises a bushing (35) as the damping member, said bushing (35) co-operating in an interference-fitted manner with said wall of the arm.

7. A tensioner according to claim 6, wherein said bushing (35) has an open C-shape and said second spring is a C-shaped blade spring (36) exerting a radial load on said bushing (35) to force it against said wall of the arm.

8. A tensioner according to claim 7, wherein said fixed part (2) comprises a base plate (6) to which said pivot (7) is fastened, said bushing (35) and said blade spring (36) being anchored to said base plate (6).

9. A tensioner according to claim 8, wherein said base plate (6) has a first projection (39) for anchoring said bushing (35) and said blade spring (36) to said fixed part (2), and a second projection (40) for constraining one end of said main spring (5) to said fixed part (2).

10. A tensioner according to claim 8, wherein said base plate (6) comprises a projection (56) for constraining one end of said main spring (5) to said fixed part (2) and a slot (55) prismatically engaged by an end portion (54) of the blade spring (36).

11. A tensioner according to claim 9, further comprising a dust protection ring (20) interposed between one of the bearings (15) and a shoulder (24) of the pivot (7) and forming a labyrinth seal with a cavity (27) of the connection portion (10).

12. The tensioner according to claim 1, wherein tensioning of the belt via the main spring (5), support of the arm (3) via the at least one rolling bearing (14, 15), and damping via the damping device (34) are performed independently of each other without functional interaction between the main spring, the at least one rolling bearing, and the damping device.

13. A belt tensioner for a belt drive of a motor vehicle engine, comprising:
- a fixed part (2) configured to be fixed with respect to the engine and provided with a pivot (7) defining a rotation axis (A);
- an arm (3) having a connection portion (10) hinged to the pivot (7) and rotatable about the rotation axis (A) and an opposite portion (42) rotatably supporting a pulley (4) configured to cooperate with a belt of the drive;
- a main spring (5) interposed between the fixed part (2) and the arm (3) to exert thrust on said arm (3) such as to rotate said arm towards the belt; and
- at least one rolling bearing (14, 15) interposed between the arm (3) and the pivot (7), wherein said rolling bearing (14, 15) supports tilting loads on the arm (3); and
- a C-shaped damping device (34) rotationally locked to the fixed part (2) for damping oscillations of the arm (3) with respect to the fixed part (2) and arranged at least partially overlapping said rolling bearing (14, 15) in a radial direction, the C-shaped damping device comprising a C-shaped bushing operatively mated with a C-shaped blade spring in a forced manner so as to exert an elastic load on the bushing to maintain contact between the C-shaped bushing and the arm;
- wherein said rolling bearing prevents tilting loads from interfering with said damping device (34);
- wherein when the arm rotates in a first direction toward the belt, friction contact between the C-shaped bushing and the arm radially contracts the C-shaped blade spring, and when the arm rotates in a direction opposite the first direction, the C-shaped blade spring expands and increases contact pressure between the C-shaped bushing and the arm.

14. A tensioner according to claim 13, wherein a plane perpendicular to the rotation axis (A) positioned through the at least one roller bearing passes through the pulley.

15. A tensioner according to claim 13, wherein said base plate (6) has a first projection (39) for anchoring said C-shaped bushing (35) and said C-shaped blade spring (36) to said fixed part (2), and a second projection (40) for constraining one end of said main spring (5) to said fixed part (2).

16. A tensioner according to claim 13, wherein said base plate (6) comprises a projection (56) for constraining one end of said main spring (5) to said fixed part (2) and a slot (55) prismatically engaged by an end portion (54) of the C-shaped blade spring (36).

17. A tensioner according to claim 13, further comprising a dust protection ring (20) interposed between one of the rolling bearings (14, 15) and a shoulder (24) of the pivot (7) and forming a labyrinth seal with a cavity (27) of the connection portion (10).

\* \* \* \* \*